Figure 1:
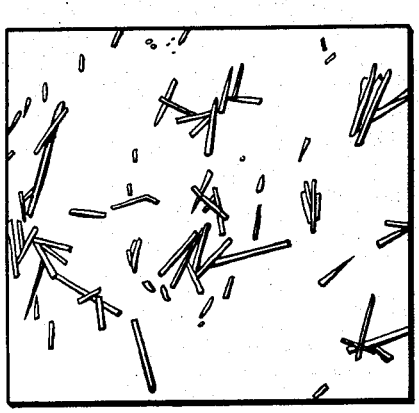

July 26, 1960  R. A. HENRY ET AL  2,946,820

HIGH BULK DENSITY NITROGUANIDINE

Filed Feb. 16, 1950

INVENTORS
RONALD A. HENRY
JOSEPH COHEN
BY
ATTORNEY

United States Patent Office 2,946,820
Patented July 26, 1960

2,946,820

HIGH BULK DENSITY NITROGUANIDINE

Ronald A. Henry and Joseph Cohen, both of Room 1609, Michelson Laboratory, Naval Ordnance Test Station, Inyokern, China Lake, Calif.

Filed Feb. 16, 1950, Ser. No. 144,554

5 Claims. (Cl. 260—564)

(Granted under Title 35, U.S. Code (1952), sec. 266)

This invention relates to the preparation of nitroguanidine in the form of coarse crystals or aggregates having very high bulk densities.

Prior methods for the production of crystalline nitroguanidine have had the inherent disadvantage of producing crystals in the form of finely felted needles having relatively low bulk density, i.e. from 0.25 to 0.30 gram per cubic centimeter. Handling of such finely felted needles is a process fraught with certain objections as noted by E. J. Pritchard and G. F. Wright in the Canadian Journal of Research, vol. 25 (July 1947), sec. F, pp. 257–263, in an article entitled "Production of Nitroguanidine with High Bulk-Density."

Modification of the crystal size of nitroguanidine by rapid crystallization from an aqueous solution in the presence of organic amines has been claimed in Patent 2,445,478. This process produces extremely minute and fine needles, having relatively low bulk density, i.e. approximately 0.25, which tend to felt badly, thereby rendering them objectionable for commercial handling, as set forth in the above-cited Pritchard and Wright article.

It is an object of this invention to provide for the production of high bulk-density nitroguanidine.

It is another object of this invention to provide for the production of nitroguandine in the form of small, hard spherulites having high bulk-density, rather than long, fine needles which have a low bulk-density and tend to felt badly.

It is a further object of this invention to provide for the production of nitroguanidine in a strictly aqueous system, thereby obviating the need of volatile, inflammable, organic solvents.

It is a still further object of this invention to provide for the production of nitroguanidine in which the mother liquor, remaining after crystallization, can be reused repeatedly without costly distillation or purification, requiring only to be enriched with more nitroguandine and more additive. The method therefore lends itself to economical cyclic process.

It is another object of this invention to provide for the production of nitroguanidine in a form that may be readily pulverized to any desired particle size, or range of sizes, or to a powder with a specific surface controlled within a desired range.

It is a still further object of this invention to provide for the production of nitroguanidine utilizing an additive which does not appreciably lower the nitrogen content of the resulting product over that found in pure nitroguanidine.

It is another object of the instant invention to provide nitroguanidine of improved physical properties, which does not mat or felt, is readily poured, and which mixes readily with other powders and with non-solvent liquids.

In its broadest aspects, the present invention contemplates the crystallization of nitroguanidine from aqueous solution thereof in the presence of an additive which is a derivative of nitroguanidine, more particularly a compound of the form, $RNHC(NH)NHNO_2$, where R is of the class:

$R'CH=N-$
$R'CONH-$
$R'SO_2NH-$
$R'NH-$
$R'SO_2-$
$R'CO-$
$R'$ and R' is of the class:

Aryl group
Alkyl group
Cycloaliphatic group

Specific examples illustrating the many ways in which the instant invention may be practiced will now be given, with reference to the drawings, the several figures of which are photomicrographs of nitroguanidine crystallized under various conditions.

Figure 2:
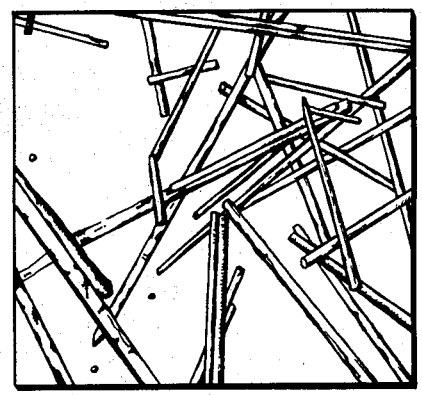
Figure 3:
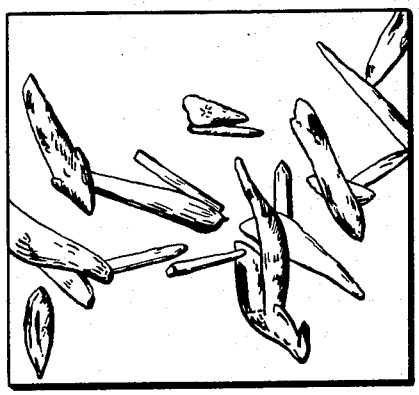
Figure 4:
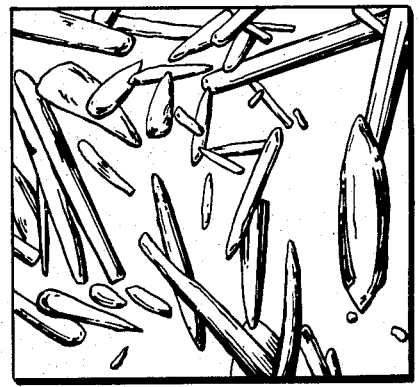
Figure 5:
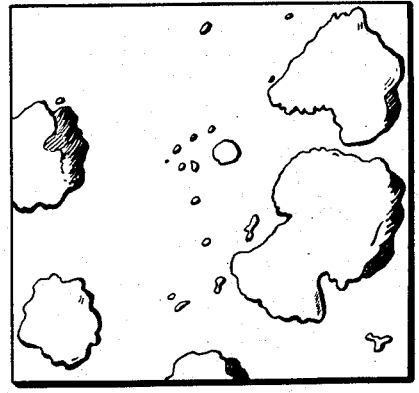

Figs. 1 and 2 illustrate crystallization without the use of an additive. Figs. 3 and 4 illustrate the crystals obtained employing an additive in accordance with the instant invention, and Fig. 5 shows the crystallized product obtained from the presently preferred practice of the instant invention.

The above-mentioned Figs. 1 and 2 have been included to illustrate the distinction between prior art methods of nitroguanidine crystallization and the methods encompassed within the scope of the instant invention. Fig. 1 is an illustration of commercial nitroguanidine. The packed bulk-density of this material is 0.30.

Fig. 2 illustrates the commercial nitroguanidine of Fig. 1 recrystallized from water. In this process 20 grams of nitroguanidine per liter of water were cooled in ambient air without stirring. The resulting crystals had a packed bulk-density of the crushed material of 0.29. Both of these figures illustrate the long, needle-like nature of the resulting crystals. That is to say, the length to breadth ratio is very high. The fine needles of the commercial product tend to felt very badly, and cannot be passed through even a sieve having 100 meshes per inch.

To further compare the practice according to the prior art with the practice according to the instant invention, the following experiments were performed. First, a 2% aqueous solution of nitroguanidine was cooled from 80° C. to 8° C. in 30 minutes with rapid agitation; the product, consisting of very small felted needles, had a bulk-density of 0.4. Secondly, an aqueous solution containing 2% nitroguanidine and 0.2% ethylenediamine was cooled and agitated as above. The nitroguanidine was recovered as very fine needles with a bulk density of about 0.25; it was so badly felted that it could not be passed through a 100-mesh sieve.

In contrast to the above cited prior art, examples will now be given of experiments performed in accordance with the instant invention to produce high bulk-density nitroguanidine crystals. The most comprehensive experiments were carried out employing nitroguanyl hydrozone of benzaldehyde as the additive, although many other additives have also been tried with generally similar results, as noted in the list cited hereinafter.

In general, the nitroguanidine and additive were dissolved in boiling water and the solution allowed to cool spontaneously to room temperature, i.e. 25° C. Cooling time was about 5½ hours. In certain cases, acid was added to the solution after it had cooled to about 80° C. The solution was allowed to stand for at least one hour at room temperature before the nitroguanidine was removed by filtration and dried. In some of the experiments, the additive was dissolved in a 30 milliliter portion of boiling ethyl alcohol which was then poured into the hot aqueous solution of nitroguandine. The alcohol was found to have no significant effect on the end product since most of it boiled out, and furthermore duplicate runs with and without alcohol showed no difference in end product.

The dry crystalline products were examined visually or microscopically, and if promising in appearance and behavior, the bulk densities were determined both on the material as it was obtained from the crystallization and on material after it was sieved.

When 100-mesh and finer material was desired, the crystalline products either were rubbed through a 100-mesh sieve by hand or were ground with a mechanical mortar and pestle prior to sieving.

Bulk-densities were determined by pouring a weighed quantity of nitroguanidine into a 25-milliliter graduate and noting the volume. The graduate was then dropped 50 times from a height of 2½ inches onto a quarter-inch leather pad secured to one-half-inch plywood, and the volume of the nitroguanidine again noted. The "apparent loose bulk-density" is then the ratio of sample weight to the poured volume, in grams per cc., and the "packed bulk-density" is the ratio of sample weight to volume occupied after the 50 drops of the cylinder.

Crystalline nitroguanidine produced in accordance with the instant invention has physical properties markedly different from prior art products. Whereas the prior art nitroguanidine tends to felt and mat, so that it is difficult to remove from a container or to shred to single aggregates or crystals, the product of the instant invention does not felt or mat even when compacted or pressed, and as a consequence may be readily poured from its container. Also, the product of our process mixes readily with other powder and with non-solvent liquids, in sharp contrast to prior art nitroguanidine.

Specific examples of the practice of the instant invention will now be given.

*Example I.*—Twenty grams of nitroguanidine, 0.8 gram of nitroguanyl hydrazone of benzaldehyde, and 12 milliliters of glacial acetic acid were dissolved in 1 liter of boiling water. The solution was cooled in ambient air without stirring. The resulting crystals are illustrated in Fig. 3. It will be noted that the needle-like character of the crystals apparent in Figs. 1 and 2 has been lost, so that this material has little tendency to felt. The packed bulk-density of the ground product of the example was 0.88 gram per cc.

*Example II.*—Forty grams of nitroguanidine, 0.8 gram of nitroguanyl hydrazone of benzaldehyde, and 12 milliliters of glacial acetic acid were dissolved in 1 liter of boiling water. The solution was cooled in ambient air without stirring. The resulting crystals are illustrated in Fig. 4. It will be noted that the length to width ratio of this product is slightly higher than that of the Fig. 3 product, although still markedly superior to that of Figs. 1 and 2. The packed bulk-density, 0.73, was also somewhat lower than that of the first example. The more desirable configuration of the Fig. 3 product, we speculate, may be due to the lower concentration of nitroguanidine.

*Example III.*—An aqueous solution containing 2% of nitroguanidine and .08% of nitroguanyl hydrazone of benzaldehyde was prepared and heated to 95–100° C. The solution was cooled to 80° C. at a convenient rate, acidified to a pH of 3.5 with acetic acid, run into an efficient shaking machine, and shaken as vigorously as possible. The solution was cooled by ambient air. The rate of temperature drop in the range of 40 to 30° C., in which most of the crystallization occurred, was about 6° C. per hour. The crystalline product was finally removed by filtration and washed with cold water until free of acid. The product consisted of small, coarse needles with lengths varying from 5 to 10 microns, and a width-to-length ratio of about 1 to 3. The bulk-density of the product was 0.77 to 0.80 gram per cubic centimeter.

The product readily passed through a 150-mesh sieve without grinding. It was found that the mother liquor could be recycled with the addition of a quantity of nitroguanidine equal to 96% by weight of the recovery from the previous cycle, and a quantity of nitroguanyl hydrazone of benzaldehyde equal to 4% by weight of the recovery. Further addition of acid is required only to maintain the pH of the solution at 3.5.

*Example IV.*—Eighty grams of nitroguanidine were rapidly and completely dissolved in 4 liters of water, contained in a 5-liter round bottom flask, by heating to 90° C. The solution was slowly agitated with a mechanically driven paddle-stirrer. The additive, 3.2 grams of the nitroguanyl hydrazone of benzaldehyde, was next added, and the heating and agitation continued until it was also completely dissolved. The heating was then discontinued and the solution cooled in such a manner as to give a temperature drop of approximately 10° C. per minute. The stirring was continued at a rate of about 180 revolutions per minute. When the temperature reached 80° C., 12 milliliters of glacial acetic acid were added. When the temperature reached 42° C., the cooling rate was moderated so that the drop in temperature was only 0.1° C. per minute. The nitroguanidine began to crystallize at about this point as hard spherulites with a pale yellow color. When the temperature reached 30° C., the product was removed by filtration, washed with cold distilled water until the washings were neutral. The yield of dried product represented a 55–60% recovery of the nitroguanidine.

The resulting spherulites are illustrated in Fig. 5. They have a mean diameter of about 2.5 millimeters and a bulk-density of .80 to .90 gram per cubic centimeter. When the dried spherulites were ground to pass through a 100-mesh sieve, the product had a bulk-density of .97 to 1.01 grams per cubic centimeter.

In our aim for a high bulk-density product, the above is the manner which we have found to date to be preferred in the practice of our invention.

It was found that the mother liquor from the above experiment could be enriched with 45 grams of nitroguanidine and 2.6 grams of nitroguanyl hydrazone of benzaldehyde in the same manner and sequence as the original run. No further addition of acetic acid was required. Upon cooling the solution in the manner outlined above, a product was obtained which was very similar to that obtained in the original run. The recovery was essentially quantitative.

*Example V.*—Twenty grams of nitroguanidine and 0.8 gram of the nitroguanyl hydrazone of vanillin were dissolved in 1 liter of water by heating to 80° C. The solution was cooled to room temperature during six hours, with slow agitation. The product was obtained as small hard aggregates and spherulites which were very easily pulverized to pass through a standard 100-mesh sieve. The packed bulk-density of the sieved product was 0.87 gram per cubic centimeter.

*Example VI.*—Ten grams of nitroguanidine and 0.4 gram of nitroguanyl hydrazone of acetophenone were dissolved in 500 milliliters of boiling water and allowed to cool in ambient air without agitation. The nitroguanidine crystallized as short, coarse needles that were fairly easily pulverized to pass through a 100-mesh sieve. The bulk-density of the sieved product was 0.74 gram per cubic centimeter.

*Example VII.*—Twenty grams of nitroguanidine, 0.8 gram of 1-(2-methylphenyl)-3-nitroguanidine and 6 milliliters of glacial acetic acid were dissolved in one liter of boiling water. When this solution was cooled slowly in ambient air, without agitation, the nitroguanidine crystallized as coarse needles, somewhat felted. This product was harder to pulverize than that resulting from some of the other examples, but was nonetheless much more easily handled than prior art crystals, and had a markedly higher bulk-density.

The following is a list of additives which were tested and found to be effective in the practice of this invention.

Nitroguanyl hydrazone of benzaldehyde
Nitroguanyl hydrazone of vanillin
Nitroguanyl hydrazone of acetophenone
Nitroguanyl hydrazone of cinnamaldehyde
Nitroguanyl hydrazone of hydrocinnamaldehyde
Nitroguanyl hydrazone of phenylacetaldehyde
Nitroguanyl hydrazone of o-chlorobenzaldehyde
Nitroguanyl hydrazone of salicylaldehyde
Nitroguanyl hydrazone of o-methoxybenzaldehyde
Nitroguanyl hydrazone of furfural
Nitroguanyl hydrazone of m-nitrobenzaldehyde
1-phenyl-3-nitroguanidine
1-(2-methylphenyl)-3-nitroguanidine
1-(2-pyridyl)-3-nitroguanidine
1-(3-methylphenyl)-3-nitroguanidine
1-(4-methylphenyl)-3-nitroguanidine
1-(2-ethoxyphenyl)-3-nitroguanidine
1-(2-methoxyphenyl)-3-nitroguanidine
1-(4-methoxyphenyl)-3-nitroguanidine
1-benzyl-3-nitroguanidine
1-($\beta$-phenethyl)-3-nitroguanidine
1-(dl-$\alpha$-phenethyl)-3-nitroguanidine
1-(2-aminophenyl)-3-nitroguanidine
1-(4-aminophenyl)-3-nitroguanidine
1-(3-hydroxyphenyl)-3-nitroguanidine
1-(4-hydroxyphenyl)-3-nitroguanidine
1-(4-nitrobenzamido)-3-nitroguanidine
1-benzamido-3-nitroguanidine
1-benzenesulfonamido-3-nitroguanidine
1-anilino-3-nitroguanidine
N-nitroguanyl-benzene-sulfonamide
1-benzoyl-3-nitroguanidine
Nitroguanyl hydrazone of n-butyraldehyde
Nitroguanyl hydrazone of n-heptaldehyde
1-n-butyl-3-nitroguanidine
1,2-di(nitroguanido)ethane
Ethyl N-(nitroguanyl)glycinate
Formylnitroaminoguanidine
Acetylnitroaminoguanidine
Ethyl N-(nitroguanido) carbamate
1-butyryl-3-nitroguanidine
Nitroguanyl hydrazone of cyclohexanone
1-cyclohexyl-3-nitroguanidine Concerning the variables in the practice of the instant invention, we have found the following criteria to apply generally. As a rule, a relatively low concentration of nitroguanidine yields the best results. A concentration of 1 to 8% is preferred, more particularly 2 to 4%.

The concentration of the additive should be such as to maintain the additive concentration at or near saturation level, particularly at the temperature at which the nitroguanidine first begins to crystallize. For the particular additive, nitroguanyl hydrazone of benzaldehyde, it was found that the optimum concentration is about 0.8 gram per liter of water when the solution is acidified, and somewhat less in neutral solutions. A preferred range is from 0.02 to 1.0% additive, more particularly .06 to .08%.

A pH between 2 and 8 is preferred in the practice of the instant invention, more particularly 3 to 4.

In general it was found desirable to effect a relatively slow rate of cooling for optimum results. The critical period was found to be the phase of actual crystallization of nitroguanidine. If desired, the solution may be rapidly cooled to a few degrees above the temperature of the initial crystallization, followed by a more moderate rate of cooling, i.e. less than 0.2° C. per minute, during the actual crystallization.

As a rule it has been found that agitation yields somewhat more desirable results from the standpoint of high-bulk-density.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. The method of producing high bulk-density nitroguanidine which comprises the step of crystallizing the same from a 1 to 8% aqueous solution of nitroguanidine having a pH of from 2 to 8 in the presence of an additive chosen from the group consisting of nitroguanyl hydrazone of benzaldehyde, nitroguanyl hydrazone of vanillin, nitroguanyl hydrazone of acetophenone, nitroguanyl hydrazone of salicylaldehyde, 1-phenyl-3-nitroguanidine, 1-(2-methylphenyl)-3-nitroguanidine, 1-(3-methylphenyl)-3-nitroguanidine, 1-(4-methylphenyl)-3-nitroguanidine, 1-(2-ethoxyphenyl)-3-nitroguanidine, 1-(2-methoxyphenyl)-3-nitroguanidine, and 1-(4-methoxyphenyl)-3-nitroguanidine.

2. The method of claim 1 carried out in a weak acid medium.

3. The method of producing nitroguanidine which comprises the step of crystallizing the same from a 1 to 8% aqueous solution of nitroguanidine having a pH of from 2 to 8 in the presence of an additive consisting of nitroguanyl hydrazone of benzaldehyde.

4. The method of producing nitroguanidine which comprises the step of crystallizing the same from a 1 to 8% aqueous solution of nitroguanidine having a pH of from 2 to 8 in the presence of an additive consisting of nitroguanyl hydrazone of vanillin.

5. The method of producing nitroguanidine which comprises the step of crystallizing the same from a 1 to 8% aqueous solution of nitroguanidine having a pH of from 2 to 8 in the presence of an additive consisting of nitroguanyl hydrazone of acetophenone.

References Cited in the file of this patent

UNITED STATES PATENTS

| | | |
|---|---|---|
| 2,395,857 | Foster et al. | Mar. 5, 1946 |
| 2,445,478 | Foster et al. | July 20, 1948 |

OTHER REFERENCES

Chemical Abstracts, vol. 42, page 639 (1948) (abstract of Pritchard et al., "Can. J. Research," 1947, vol. 25, pages 257 to 263).